United States Patent

Jeske

[11] Patent Number: 5,831,359
[45] Date of Patent: Nov. 3, 1998

[54] ELECTRONICALLY COMMUTATED MOTOR WITH EXTERNAL ROTOR

[75] Inventor: Frank Jeske, Tennenbronn, Germany

[73] Assignee: Papst Motoren GmbH & Co. KG, St. Georgen, Germany

[21] Appl. No.: 717,713

[22] Filed: Sep. 23, 1996

[30] Foreign Application Priority Data

Sep. 29, 1995 [DE] Germany ............... 295 15 530 U

[51] Int. Cl.$^6$ ..................... H02K 1/08; H02K 1/14
[52] U.S. Cl. ............. 310/68 B; 310/49 R; 310/254; 310/269
[58] Field of Search ................. 310/68 B, 68 D, 310/257, 49 R, 254, 269

[56] References Cited

U.S. PATENT DOCUMENTS

| | | | |
|---|---|---|---|
| 4,194,743 | 3/1980 | Ohsawa et al. | 274/1 E |
| 4,656,381 | 4/1987 | Komatsu | 310/257 |
| 4,891,567 | 1/1990 | Fujitani et al. | 318/254 |
| 4,899,075 | 2/1990 | Hasebe | 310/257 |
| 5,148,069 | 9/1992 | Nonaka et al. | 310/68 R |
| 5,539,263 | 7/1996 | Lee | 310/67 R |

FOREIGN PATENT DOCUMENTS

| | | |
|---|---|---|
| 0 160 522 A2 | 11/1985 | European Pat. Off. . |
| 2841137-A1 | 4/1979 | Germany . |
| 3028747 A1 | 3/1982 | Germany . |
| 9202674 U | 8/1993 | Germany . |

OTHER PUBLICATIONS

Derwent English–language abstract & patent family list re DE 2841137, Sony.

*Primary Examiner*—Steven L. Stephan
*Assistant Examiner*—Tran N. Nguyen
*Attorney, Agent, or Firm*—Ware, Fressola, Van der Sluys & Adolphson LLP; Milton Oliver

[57] ABSTRACT

An electronically commutated motor (10) has a permanent-magnet external rotor (58) and an inner stator (20) with claw-poles (30,32; 44,46). Preferably, the claw-poles extend axially from opposite directions along the outside of the stator (20) and are interdigited. A galvanomagnetic sensor (14) generates a rotor position signal, based upon measurement of a stray or cross-flux field ($\phi_1$) of the rotating permanent-magnet external rotor (58,66). Between the claw-poles of the stator (20) are a plurality of neutral field zones (52). The motor turns in a predetermined direction (72) and the galvanomagnetic sensor (14) is positioned adjacent the stator (20) at a location which is circumferentially displaced with respect to a neutral field zone (52), in order to trigger early commutation of current to windings (22,24) of the motor (10). The stator structure includes a soft ferromagnetic element (28) which is formed with a cutout (76,76') adjacent the sensor (14) in order to increase the effective flux exerted on the sensor by the field of the rotor, and to thereby improve the precision of the rotor position signal generated by the sensor (14) during operation of the motor (10). The motor includes a control circuit actuated by the sensor output signal (86) which commutates current through the motor windings (22, 24).

5 Claims, 5 Drawing Sheets

5,831,359

ELECTRONICALLY COMMUTATED MOTOR WITH EXTERNAL ROTOR

FIELD OF THE INVENTION

The present invention relates generally to an electronically commutated motor and, more particularly, to a motor with an annular rotor which is adapted to drive a ventilating fan.

BACKGROUND

Such motors are often used to drive fans, e.g. inside a computer directly on the circuit board, in order to cool microprocessors or the like, so a particularly compact structure is important. One therefore arranges the pole pieces or sheets on both sides of a stator coil and permits the claw poles of these pole pieces to interfit interdigitally, as shown for example in FIG. 2. This results in a very short, compact axial structure.

Further, one preferably arranges the Hall generator, which controls the commutation of the motor, in such a manner that the commutation is performed a bit early, which is referred to in the jargon of the art as "early ignition" although this is naturally not an "ignition" in the usual sense of the word, but rather the switch-on and switch-off of the currents in the phases of a stator winding. To this end, the Hall generator must be displaced, with respect to the so-called "neutral field zone" of the stator, opposite to the rotation direction. In the prior art claw-pole structures, it was disadvantageous that the output signal of the Hall generator became substantially deformed, and a reliable startup in the correct rotation direction was not assured in all cases.

SUMMARY OF THE INVENTION

Accordingly, it is an object of the present invention to provide an improved electronically commutated motor with an external rotor, particularly a compact or miniature motor.

Briefly, the invention achieves this object by an electronically commutated motor, adapted to drive a fan, having an external permanent-magnet rotor, an inner stator, soft ferromagnetic elements of the claw-pole type, a galvanomagnetic sensor located adjacent the stator and controlled by the cross-flux or leakage field of the permanent-magnet external rotor, which sensor is displaced with respect to the neutral field zone of the stator in a direction opposite the rotation direction and is located adjacent one of the soft ferromagnetic elements of the stator. There is a cutout in this soft ferromagnetic element adjacent the galvanomagnetic sensor, which increases the intensity of the magnetic flux applied by the external rotor to the sensor, and thereby improves the precision of the rotor position signal generated, during operation, by this sensor. One therefore achieves, by simple measures, that the motor always starts up in the correct direction, and that the signals generated by the galvanomagnetic sensor are sufficiently strong to permit operation of the motor with good efficiency.

Further details and advantageous refinements of the invention will be apparent from the embodiment described below and shown in the drawings, which is to be understood as exemplary only, and not as a limitation of the invention.

BRIEF FIGURE DESCRIPTION

Figure 17:
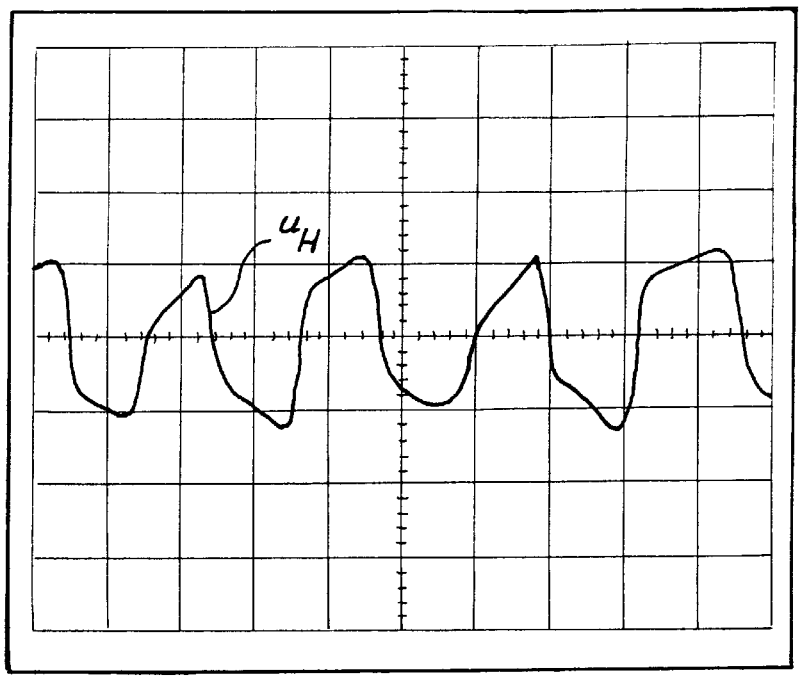
Figure 18:
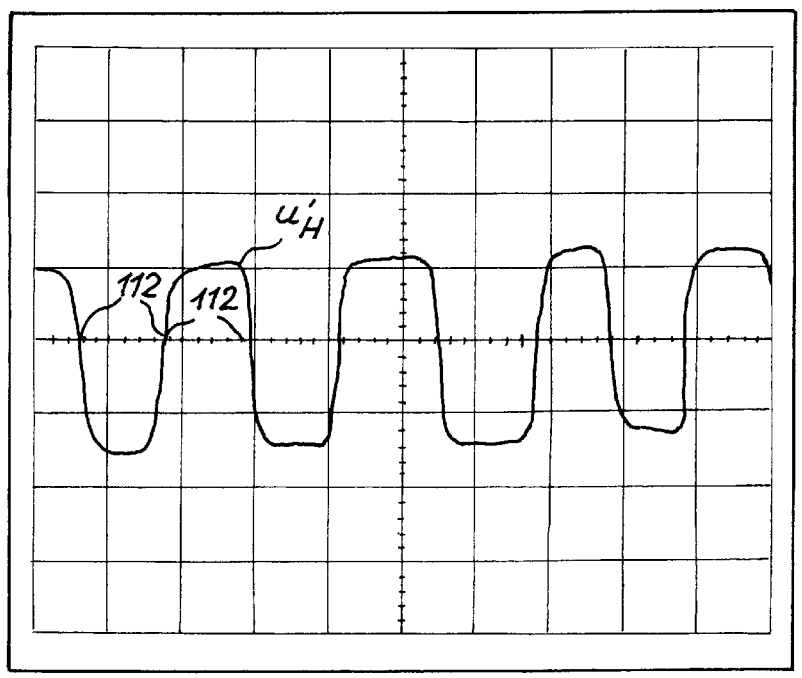

FIG. 17 is a plot of the output signal of a Hall generator during turning of the rotor, for the case in which no cutout, as taught by the present invention, is used in the lower pole piece; and FIG. 18 is a plot analogous to FIG. 17, in which use of the recess taught by the present invention results in a reliable commutation at the desired points in time, and a reliable startup of the motor in the correct rotational direction.

DETAILED DESCRIPTION

Figure 1:
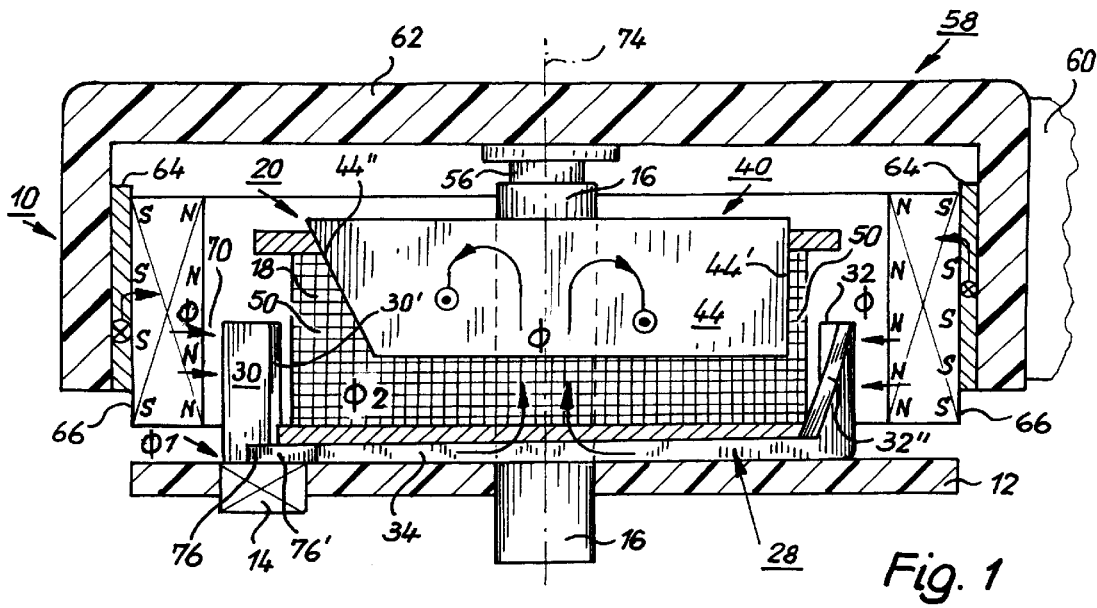
FIG. 1 is a schematic illustration of the motor with external rotor of the present invention, partially in section, and enlarged.

FIG. 1 is a strongly schematic illustration of a motor 10 having an external rotor. The motor has a circuit board 12, on which the electronic components of the motor are usually located, as described below with reference to FIG. 16. These components include a Hall generator 14, preferably a conventional Hall IC (integrated circuit) such as HONEYWELL type SS41-1 or ALLEGRO type UGN3131UA. Naturally, it is equally possible to use other functionally equivalent galvanomagnetic sensors.

Figure 2:
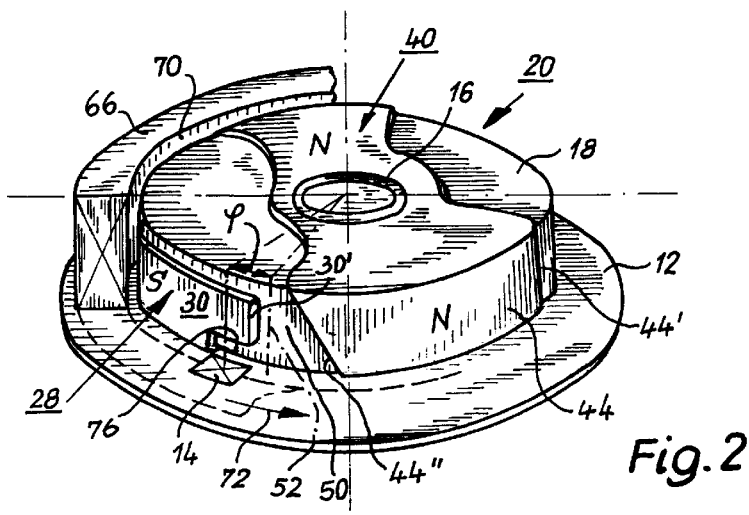
FIG. 2 is a perspective view of the motor of FIG. 1, likewise strongly schematized.

On the circuit board 12 is mounted a bearing tube or pylon 16, and around the latter is arranged the coil arrangement 18 of a stator 20. This coil arrangement 18 includes, in the preferred embodiment, two winding phases 22 and 24 (cf. FIG. 16), usually in the form of a double-wound (bifilar) winding. The coils thus extend around the rotational axis of motor 10. Consequently, when one phase 22 is excited, a north pole is created at the upper end of coil arrangement 18 and a south pole is created at the lower end, as shown in FIG. 2. Conversely, when the other phase 24 is excited, a south pole is created at the upper end of coil arrangement 18 and a north pole is created at the lower end. Alternatively, the coil arrangement could have only a single winding strand, which is supplied with current via a full bridge circuit. In this manner, the current would flow through this (single) winding alternately in one direction or in the other.

At the lower end of coil arrangement 18, there is secured, to bearing pylon 16 (of soft ferromagnetic material), a lower pole piece 28 of soft ferromagnetic material (e.g. sheet metal), which has two upwardly projecting claws 30, 32 and is shown by itself in FIGS. 4–9. Its bottom, flat portion is designated 34. It is pressed with an inner collar 36 onto bearing tube 16.

At the upper end of coil arrangement 18, there is secured, onto bearing pylon 16, an upper pole piece 40 which has two downwardly projecting claws 42, 44, and is shown by itself in FIGS. 10–15. Its top, flat portion is designated 46. It is pressed with an inner collar 48 onto bearing pylon 16.

As is clearly apparent from FIG. 2, the four claws 30, 32, 42, 44 project interdigitally with respect to each other and form four stator poles with equal spacing, which poles are separated by respective pole gaps 50, one of which is shown in FIG. 2. Through each of these pole gaps extends a respective neutral field zone 52 of the stator and, as shown in FIG. 2, Hall generator 14 is displaced, with respect to this neutral field zone by an angle $\zeta$ of, e.g., 15° electrical, opposite to the rotation direction, in order to effect an early-adjusted commutation, which is necessary for optimal operation of such motors.

Within bearing pylon 16, there is rotationally supported the shaft 56 of an external rotor 58 which has a plastic hoodlike outer portion 62 (which can support fan blades indicated schematically at 60), on whose annular inner surface is secured a magnetic return path ring 64 of soft ferromagnetic material. Within this ring 64, there is secured a rotor magnet 66, usually a so-called "rubber magnet", i.e. a mixture of rubber or synthetic elastomer and a hard ferrite. A preferred component is type RMS11 from the firm Tokioferrit (Tokyo Ferrite). This magnet ring 66 has four-pole magnetization, i.e. has four magnetic poles N-S-N-S (cf. FIG. 16) and these are essentially rectangularly magnetized. In practice, the result is an essentially trapezoidal distribution of magnetic flux density, measured along the circumference of the rotor.

Since magnet ring 66 is radially magnetized, there is exerted, in the direction of Hall generator 14, only a stray or cross-flux of magnet ring 66, and this stray or cross-flux is designated $\phi_1$ in FIG. 1.

Conversely, the main flux of rotor magnet 66 is designated $\phi$. This flux runs, as indicated in FIG. 1, e.g. from the north poles of magnet ring 66 via the claws 30, 32 to the lower pole piece 28, through the bearing pylon 16 to the upper pole piece 40 and its claws 42, 44 to the (unshown) south poles of magnet ring 66, and from this via the magnetic return path ring 64 back to the north poles of rotor magnet 66, forming a magnetic circuit. This is indicated in FIG. 1 using the standard symbols of electrical engineering, in which a dot inside a circle symbolizes an arrow point and an "x" inside a circle symbolizes an arrow end.

Figure 3:
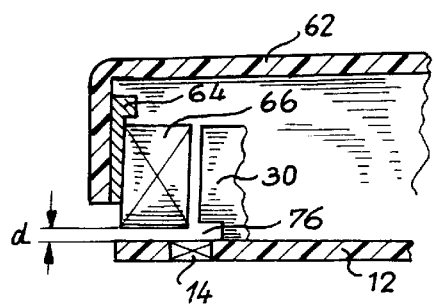
FIG. 3 is a static illustration for explanation of the mode of operation.
Figure 4:
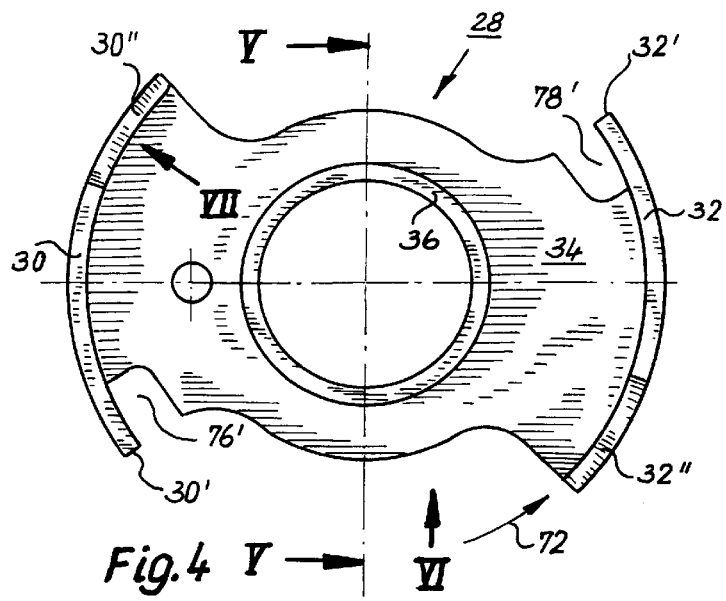
FIG. 4 is a plan view of a lower pole sheet of the motor of FIGS. 1–3 and of its claw-poles.
Figure 5:
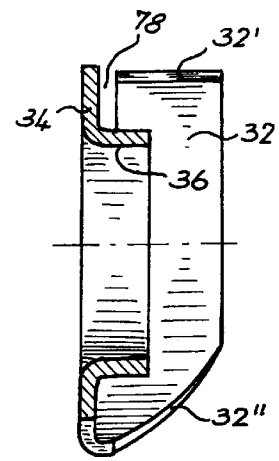
FIG. 5 is a section along line V—V of FIG. 4.
Figure 6:
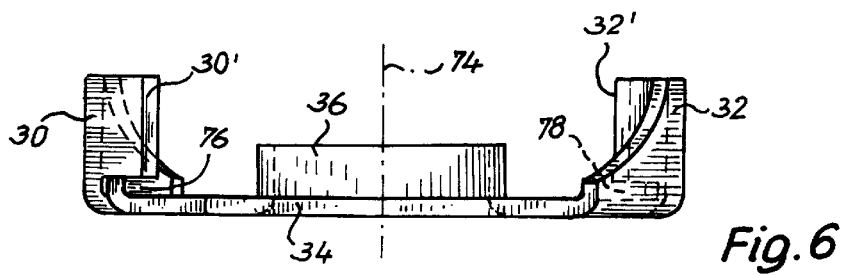
FIG. 6 is a side view of the pole sheet of FIG. 4, looking in the direction of arrow VI of FIG. 4.

Other considerations apart, it would be desirable to locate the Hall generator 14 directly in the air gap 70 of the motor, e.g. on claw 30 of the lower pole piece 28, but this doesn't work for mechanical reasons since the motor is extremely small (cf. FIGS. 8–9), and one must instead locate the Hall generator 14 on the circuit board 12, where only the cross-flux $\phi_1$ of rotor magnet 66 is exerted upon it. This cross-flux becomes proportionally weaker, the greater the distance d between rotor magnet 66 and Hall generator 14 (shown schematically in FIG. 3) becomes. Another troubling factor is that the lower pole piece 28 "draws off" this cross-flux $\phi_1$ away from Hall generator 14, and the Hall signal is thereby further reduced. This effect is amplified by the fact that Hall generator 14 is, as previously described, displaced by the angle $\zeta$ (FIG. 2) opposite the rotation direction, which is indicated in FIG. 2 by arrow 72.

FIGS. 5–9 show the configuration of the lower pole piece 28 in accordance with the invention. Its claw poles 30,32 have, at each of their respective trailing (in rotation direction 72 of magnet 66) edges 30', 32', a straight edge, i.e. it extends parallel to the axis 74 of rotation of motor 10. These leading edges 30', 32' transition at their lower ends into a respective cutout or gap 76, 78 which extends so far opposite the rotation direction 72, that, in the finally assembled motor, it forms a "window" for the Hall generator 14, as can be seen particularly clearly in FIG. 2.

These cutouts 76,78 continue, in the flat portion 34 of lower pole piece 28, radially inward as cutouts 76', 78' (FIG. 4) which also serve as a window for Hall generator 14, and their radial extent corresponds to this requirement or function.

Naturally, in principle only window 76, 76' is needed, but for symmetry reasons, the window 78, 78' can also be provided, which additionally facilitates assembly, since one need not be concerned about the correct angular placement of lower pole piece 28. Further, the symmetrical structure of claw-poles 30, 32 has the significant advantage that the magnetic flux in the motor is completely evenly distributed, so that the magnetic forces created at claw-poles 30, 32 are equally large and the radial force exerted is symmetrical. This has the effect that the creation of solid-conducted or resonant noise is avoided, and the motor runs more quietly.

FIG. 17 shows the voltage signal $U_H$ of Hall generator 14 without window 76,76' and FIG. 18 shows the same signal $U'_H$ using window 76,76'. One recognizes, that in FIG. 17 the commutation instants are displaced, and that the signal there is deformed, whereas by contrast, in FIG. 18, the signal represents a clear reflection of the magnetization pattern of rotor magnet 66. This is also due to the fact that in FIG. 17 (without use of window 76,76') the signal detected at Hall generator 14 is so weak that it can be distorted by a magnetic flux $\phi_2$ generated in stator 20 during operation, which one can call "armature reaction." By contrast, in FIG. 18 (with use of window 76,76'), a relatively large stray or cross-flux will act on Hall generator 14, and thus, in FIG. 18, a reliable startup is assured, which is not the case in FIG. 17. Furthermore, efficiency is also higher in the FIG. 18 structure.

Figure 7:
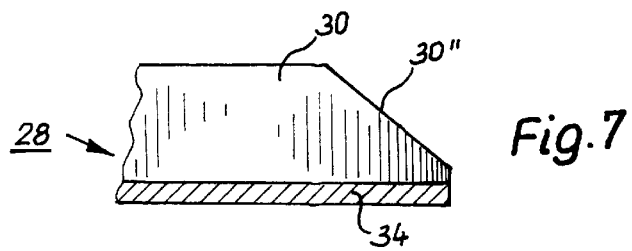
FIG. 7 is a developed view of a tapered portion of a claw of the pole piece of FIGS. 4 to 6, looking in the direction of arrow VII of FIG. 4.

At their leading (with respect to direction 72) ends, the claw-poles 30,32 have slanted or tapered edges 30",32" which are necessary for generation of a reluctance torque. The development according to FIG. 7 shows the course of such a slanted edge 30".

Figure 8:
FIG. 8 is a view like FIG. 6, but in the actual size of a commercial embodiment (compare adjacent centimeter scale)
Figure 9:
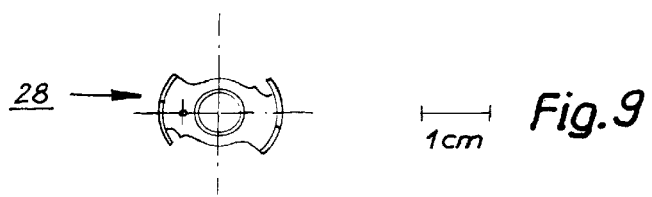
FIG. 9 is a view like FIG. 4, but in actual size (compare adjacent centimeter scale)

From FIGS. 8–9, the actual size of pole piece 28 is apparent. The present invention is preferably employed in miniature motors used for driving a fan with which electronic components are directly cooled, e.g. a fan for direct mounting on a microprocessor.

Figures 10, 11:
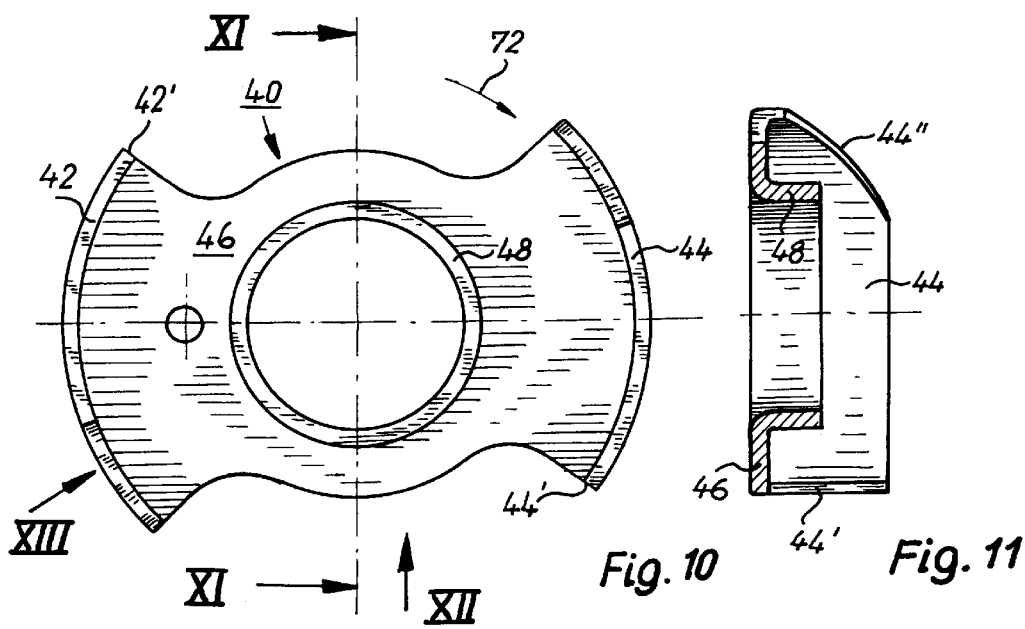
FIG. 10 is a plan view of an upper pole piece of the motor of FIGS. 1–3 and of its claw-poles.
FIG. 11 is a section along the line XI—XI of FIG. 10.
Figure 12:
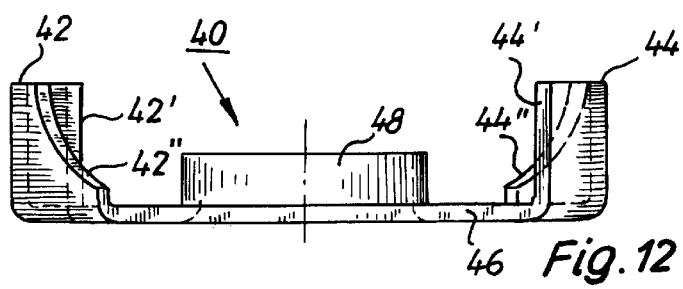
FIG. 12 is a side view of the pole sheet of FIG. 10, looking in the direction of arrow XII of FIG. 10.
Figure 13:
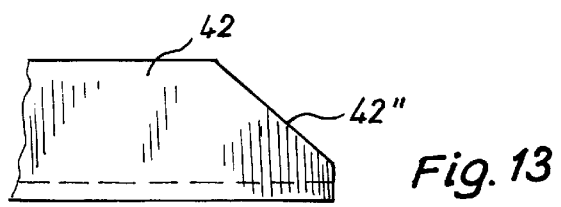
FIG. 13 is a developed view of a tapered portion of a claw of the pole sheet of FIG. 10 to 12, looking in the direction of arrow XIII of FIG. 10.

FIGS. 10–15 show the upper pole piece 40, and in FIG. 10, the rotation direction is indicated by arrow 72. Here, also, the trailing (in direction 72) edge 42',44' of each claw-pole 42,44 is straight (parallel to rotational axis 74) and the leading edge 42",44" is slanted or tapered, as can be best seen in the development of FIG. 13.

Figure 14:
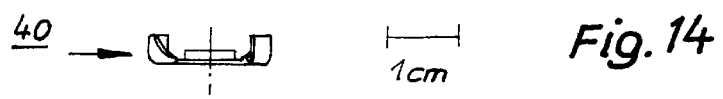
FIG. 14 is a view like FIG. 12, but in actual size (compare adjacent centimeter scale)
Figure 15:
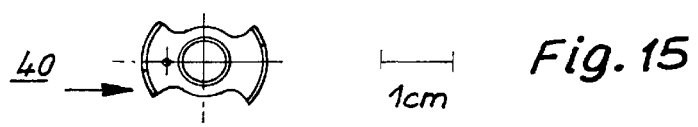
FIG. 15 is a view like FIG. 10, but in actual size (compare adjacent centimeter scale)

As one can conclude from FIG. 1, there follow, in rotation sequence 72, a straight edge (e.g. 30') of a claw-pole (e.g. 30), a slanted edge (e.g. 44") of a following claw-pole (e.g. 44), then another straight edge 40', a slanted edge 32", etc. One thus obtains the reluctance torque desired in this kind of motor structure. FIGS. 14–15 show the upper pole piece 40 in actual size.

DRIVING CIRCUIT

Figure 16:
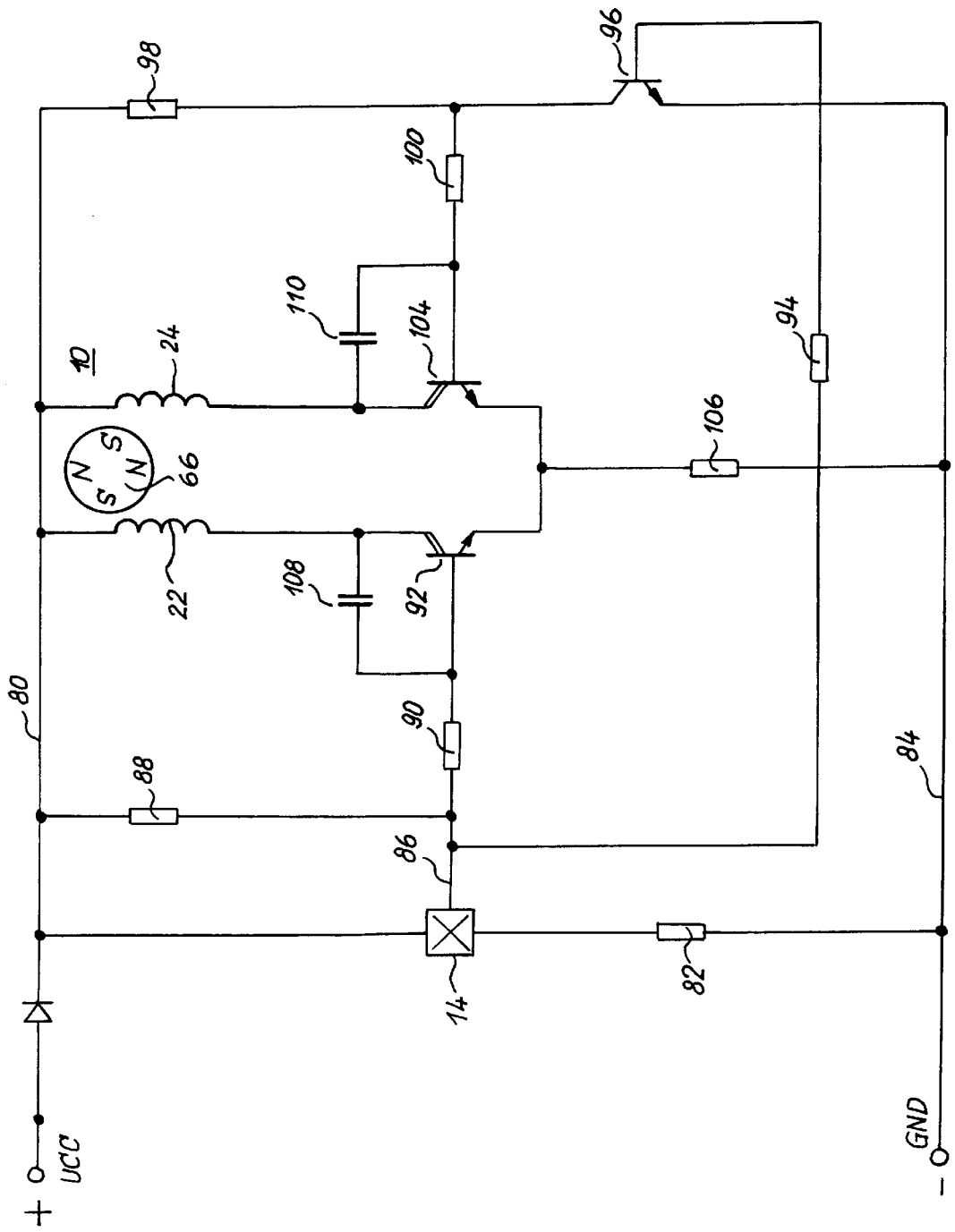
FIG. 16 is a diagram of a circuit which can be used with the motor according to the preceding figures.

FIG. 16 shows a circuit for operation of motor 10. Hall generator 14 is here an integrated circuit (IC), e.g. HONEYWELL or ALLEGRO as mentioned above. For its power supply, Hall IC 14 is connected at a first terminal to a positive bus 80 and at a second terminal—via a resistor 82—to a negative bus 84. Its output 86 is connected via a pull-up resistor 88 to positive bus 80, via a resistor 90 with the base of a first NPN Darlington transistor 92, and via a resistor 94 with the base of an NPN transistor 96 which serves as a phase-reversing transistor. The emitter of transistor 96 is connected to negative bus 82, its collector is connected via a resistor 98 to positive bus 80 and via a resistor 100 to the base of a second NPN Darlington transistor 104.

The emitters of first and second NPN Darlington transistors 92, 104 are connected to each other and, via a common emitter resistor 106, to negative bus 84. The collector of transistor 92 is connected via strand or winding 22 of motor 10 to positive bus 80. Symmetrically, the collector of transistor 104 is connected via strand or winding 24 of motor 10 to positive bus 80. Between collector and base of each of transistors 92, 104, a respective capacitor 108, 110 (e.g. 3.3 nanofarads) is connected, whose function is to prolong the switching processes and thereby to avoid generating electromagnetic noise during commutation.

Whenever the signal at output 86 of Hall-IC 14 goes high, the transistors 92 and 96 become conductive. Thereby, winding strand 22 receives current, while transistor 104 blocks, since its base is connected via transistor 96 to negative bus 84.

Conversely, when the signal at output 86 of Hall-IC 14 goes low, transistor 92 and 96 become non-conductive. Via resistor 98, transistor 104 receives a base current, which makes it conductive, so that in this case winding strand 24 of motor 10 receives current.

Referring to FIG. 18, since the commutation occurs essentially at the instants 112, at which the voltage signal $U'_H$ changes its sign, one recognizes, by comparison of FIGS. 17 and 18, the sharp improvement provided by the present invention.

The magnetization of rotor magnet 66 is preferably chosen such that the boundaries between its poles are either not at all, or only slightly, inclined, i.e. these boundaries extend essentially parallel to rotational axis 74. Hereby, the (very small) magnet ring 66 of such a miniature motor 10 is best used, since every slanting of the pole boundaries would cause a weakening of the rotor magnet.

A significant feature of the invention is that one so dimensions the cutout 76, 76' that it minimizes the "drawing off" effect of the lower pole piece 28 on the stray or cross-flux of rotor magnet 66 while, simultaneously, no additional resistance is created in the (previously described above) magnetic circuit of the motor, and the reluctance torque is not weakened. By means of the present invention, it is possible to satisfy these countervailing requirements using the same structure.

Naturally, various modifications and refinements are possible within the scope of the inventive concept and the invention is not limited to the particular embodiment shown and described, but rather is defined by the following claims.

What is claimed is:

1. An electronically commutated motor comprising
   a permanent-magnet external rotor having an essentially radial magnetization,
   an inner stator separated from said external rotor by an air gap and including
   a coil arrangement encircling a rotational axis of said rotor and having two axial ends,
   a first soft ferromagnetic claw pole element arranged at one axial end of said coil arrangement and having first claw poles extending along said air gap and over the outer periphery of said coil arrangement,
   a second soft ferromagnetic claw pole element arranged at the other axial end of said coil arrangement and having second claw poles extending along said air gap and over the outer periphery of said coil arrangement,
   the first claw poles extending into gaps provided between the second claw poles,
   the second claw poles extending into gaps provided between the first claw poles, said claw poles being shaped to cause a predetermined rotational direction of said rotor,
   a galvanomagnetic sensor for controlling the energization of said coil arrangement depending on the rotational position of the rotor, said galvanomagnetic sensor being arranged close to an adjacent one of said claw pole elements and within a stray-flux field of said permanent-magnetic external rotor, said galvanomagnetic sensor being circumferentially displaced contrary to the predetermined rotational direction away from a neutral field zone of said stator,
   said adjacent claw pole element being formed with a cutout at a location close to said galvanomagnetic sensor to increase the effective magnetic stray-flux exerted on said galvanomagnetic sensor by said external rotor and to thereby increase precision of a rotor position signal generated by said sensor during operation of said motor.

2. The motor according to claim 1, wherein
   said claw pole elements each comprise a flat portion from which are orthogonally bent a plurality of claw-poles;
   said cutout being formed adjacent the orthogonal bend between one of said flat portions and one of said claw-poles.

3. The motor according to claim 2, wherein said cutout is formed in at least one of said flat portion and said one claw-pole.

4. The motor according to claim 1, wherein, with reference to said predetermined direction of rotation, at least one of said claw-poles has a slanted leading edge and a straight trailing edge, said trailing edge extending essentially parallel to the rotational axis of said rotor;
   said cutout being at least partially formed in said straight edge of said claw-pole.

5. The motor according to claim 1, wherein, in addition to said cutout in said adjacent claw pole element close to said galvanomagnetic sensor, a second, essentially identically-shaped cutout is formed in said adjacent claw pole element at a position symmetrically located with respect to the rotational axis of said rotor.

* * * * *

UNITED STATES PATENT AND TRADEMARK OFFICE
CERTIFICATE OF CORRECTION

PATENT NO. : 5,831,359
DATED : Nov. 3, 1998
INVENTOR(S) : Jeske

It is certified that error appears in the above-identified patent and that said Letters Patent is hereby corrected as shown below:

1. In column 4, line 9, "leading" should be --trailing--.

Signed and Sealed this

Twenty-third Day of February, 1999

Attest:

Q. TODD DICKINSON

*Attesting Officer*     Acting Commissioner of Patents and Trademarks